March 10, 1964 G. B. BENANDER 3,124,021
WIRE INSULATION STRIPPER
Filed April 13, 1959 2 Sheets-Sheet 1

Inventor:
George B. Benander
by Allard G. Braddock
His Attorney

March 10, 1964

G. B. BENANDER 3,124,021

WIRE INSULATION STRIPPER

Filed April 13, 1959

2 Sheets-Sheet 2

Inventor:
George B. Benander
by Allard G. Braddock
His Attorney

United States Patent Office 3,124,021
Patented Mar. 10, 1964

3,124,021
WIRE INSULATION STRIPPER
George B. Benander, Oaklawn, R.I., assignor to General Electric Company, a corporation of New York
Filed Apr. 13, 1959, Ser. No. 805,822
5 Claims. (Cl. 81—9.5)

This invention relates to a wire insulation stripper; more particularly, the invention relates to a wiring device having a wire insulation stripper integral therewith.

From the inception of electrical wiring, pliers or knives have been the means used to strip insulation from wire ends prior to connecting the ends to wiring devices. This conventional method of insulation stripping is rather cumbersome since the technician making the installation must hold the wire to be stripped in one hand while he wields the stripping implement with the other. Many wiring devices have strip gauges thereon and where the installer uses such a gauge, it is necessary for him to measure the wire against the gauge, lay the device to one side, and pick up the stripping implement. A further disadvantage attendant to use of pliers and knives stems from the tendency of the installer to misjudge the depth of cut and score the conductor.

This invention has for one of its objects to provide an insulation stripper which will readily remove insulation from a conductor without cutting deeply into the conductor.

Another object of the invention is to provide a wiring device having a built-in wire insulation stripper.

Figure 1:
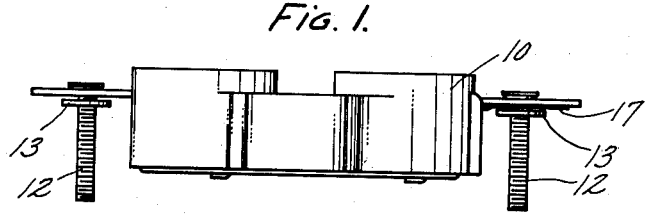
Figure 4:
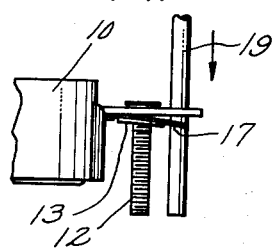
Figure 2:
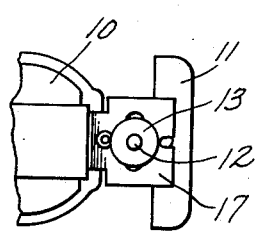
Figure 3:
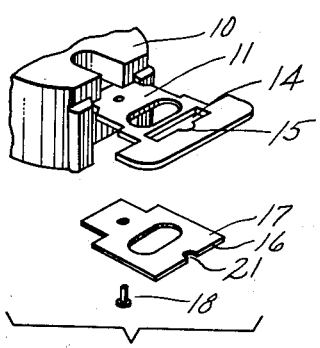
Figure 5:
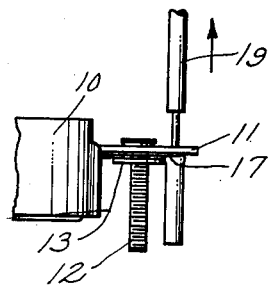
Figure 6:
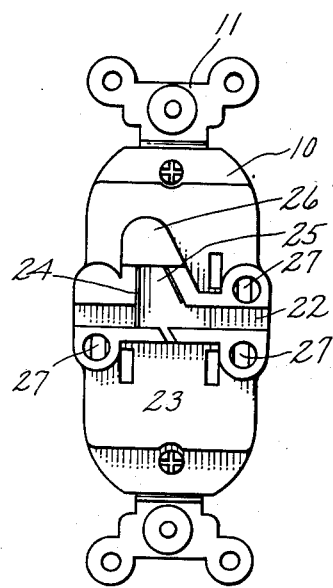
Figure 7:
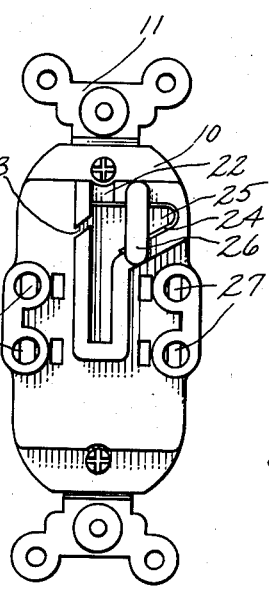
Figure 8:
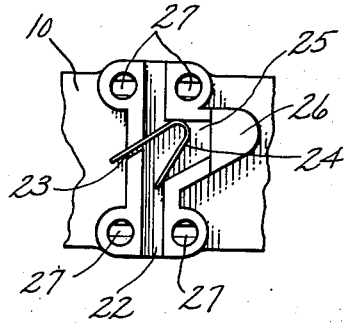
Figure 9:
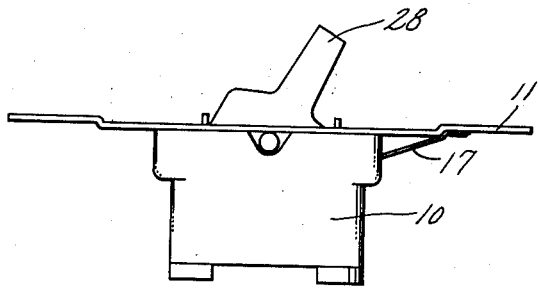
Figure 10:
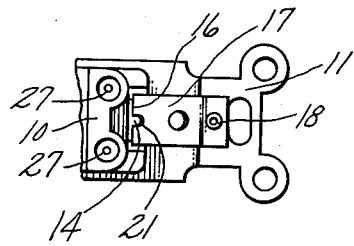
Figure 11:
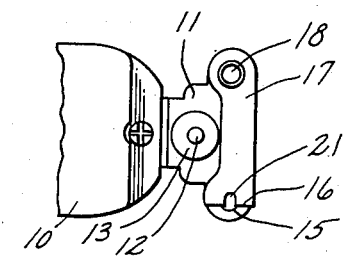
Figure 12:
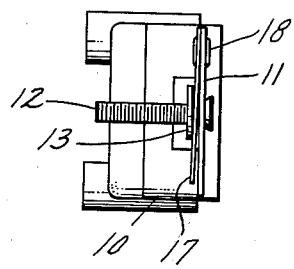
Figure 13:
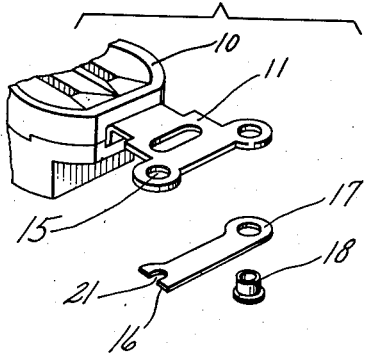

Other objects of the invention will become apparent from the following specification and the drawing wherein
FIG. 1 is a view of a convenience outlet with a wire stripper incorporated therein;
FIG. 2 is a partial view from the back side of the convenience outlet of FIG. 1;
FIG. 3 is an exploded perspective view of the portion of the convenience outlet illustrated in FIG. 2;
FIG. 4 shows a portion of the convenience outlet of FIG. 1 with an insulated wire end inserted through the wire stripper;
FIG. 5 is a view similar to FIG. 4 except that the wire is being withdrawn from the wire stripper;
FIG. 6 is a view from the back side of an alternative form of wire stripper;
FIG. 7 is a view of another alternative embodiment of the wire stripper;
FIG. 8 is a view of the wire stripper portion of the embodiment shown in FIG. 6 illustrating the means for setting the cutter;
FIG. 9 shows a switch with an alternative form of wire stripper;
FIG. 10 is a view from the back side of a portion of the switch illustrated in FIG. 9;
FIG. 11 is a view of still another embodiment of the invention;
FIG. 12 is an additional view of the embodiment of FIG. 11; and
FIG. 13 is an exploded perspective of the embodiment illustrated in FIG. 11.

Briefly stated, in accordance with one of its aspects, the invention is directed to a wire insulation stripper comprising a cutting base defining an opening through which an insulated wire end is insertable, and a cutting edge biased to a position partially blocking the opening and displaceable by contact of a wire end inserted through the opening to a position allowing the wire to slip past the cutting edge whereby the cutting edge cuts toward the wire upon withdrawal of the wire through the opening.

In the embodiment of the invention illustrated in FIGS. 1–5, a conventional convenience outlet has a housing 10 and mounting strap 11. Normally, such outlets come equipped with mounting screws 12 maintained in position by cardboard or fiber washers 13. As best shown in FIG. 3, the mounting strap 11 has an aperture 14 which may be elongated as shown and equipped with a centering notch 15 or may be circular as shown in FIG. 13. The opening or aperture 14 provides a cutting base against which wire impinges while its insulation is being cut by a cutting edge 16 of an overlapping plate 17 which is displaceably mounted on the back side of the strap 11 by means of a rivet 18. Displaceability of the plate 17 from the strap 11 may be obtained by constructing the plate 17 of thin flexible material. Since there is just a single fastener connecting the strap 11 and plate 17, it is to be noted that displacement of the plate 17 from the strap 11 is in an angular or arcuate direction.

The importance of the arcuate displacement movement of the plate 17 is shown in FIGS. 4 and 5 in which an insulated wire end 19 is inserted and then withdrawn. In FIG. 4, the wire 19 is inserted through the aperture 14 where it makes contact with the plate 17 which blocks or overlaps the aperture 14. Further movement of the wire 19 displaces the plate 17 arcuately until the wire slips past the cutting edge 16 of the plate 17. As soon as the desired length of insulation has passed the cutting edge, the wire 19 is withdrawn in the direction illustrated by the arrow in FIG. 5. Since the bias of the plate 17 is in a direction to bring it into contiguity with the mounting strap 11, the cutting edge 16 begins to cut into the insulation of the wire 19 as the wire is withdrawn, the depth of cut increasing with withdrawal. In order to center the conductor, the cutting edge 16 is equipped with a notch 21 in register with the notch 15, the notches 15 and 21 together preferably forming an aperture of circular configuration which is slightly larger than the maximum diameter of copper conductor likely to be used in the device. As soon as the plate 17 has been restored to its initial position illustrated in FIG. 1, further withdrawal of the wire 19 will produce stripping of the insulation as illustrated in FIG. 5. Occasionally it is desirable to twist the wire 19 somewhat as soon as the plate 17 has been restored to its initial position. This insures cutting the insulation around its entire circumference.

While the preferred form of the invention is the embodiment illustrated in FIGS. 1–5, and 9–13, the alternative embodiments illustrated in FIGS. 6–8 are entirely satisfactory. In FIGS. 6–8, the housing 10 rather than the mounting strap 11 serves as the cutting base for stripping the insulation. In these figures, a wire passageway 22 is molded into the housing 10. In FIG. 7, the passageway 22 is closed at one end and, therefore, serves as a gauge as well as cutting base. One side of each passageway 22 has a gap 23 which enables a U-shaped cutter blade 24 of springy material and having a notched tip to be positioned in a cavity 25 offset from the passageway 22, as best shown in FIG. 8. The cutter blade 24 is maintained in position by means of straps or webs 26 integral with the housing 10. Included in the devices of FIGS. 6–8 are screwless terminals 27 of the type described in Benander Patent No. 2,705,785 which is assigned to the same assignee as is the present application.

In the embodiment illustrated in FIGS. 6–8, the insulated wire end is inserted into the passageway 22 from the end in which pressure against the cutter 24 will enable the cutter to swing out of the passageway 22. The wire is then pushed through the passageway 22 to the extent of the length desired to be stripped and it is then withdrawn. As it is withdrawn, the notched tip of the cutter 24 begins to cut through the insulation until the wire is withdrawn to the point where the cutter 24 is in the position indicated in FIGS. 6 and 7. At this point, the cutter 24 retains the insulation and the stripped conductor is withdrawn.

The embodiment of FIGS. 9 and 10 is somewhat similar to the embodiment of FIGS. 1–5 except that the plate 17 has the cutting edge extending toward the body of the device instead of away from it. As in the case of FIGS. 1–5, the plate is mounted on a mounting strap 11 by means of a rivet 18. In this embodiment, however, the device is a switch having an actuating toggle 28. The stripping operation is the same as that described for FIGS. 4 and 5, the wire being inserted and withdrawn from the face side of the device.

The operation of the embodiment illustrated in FIGS. 11–13 is similar to that of FIGS. 1–5 except that the stripping mechanism is positioned transversely of the mounting strap 11. As in the case of the embodiment of FIGS. 1–5, the insulated wire end to be stripped is inserted and withdrawn from the face side of the device.

While the invention has been described with reference to certain specific embodiments thereof, it is obvious that there may be variations which fall within the true spirit of the invention. Therefore, the invention should be limited only as may be necessitated by the scope of the appended claims.

What I claim as new and desire to secure by Letters Patent of the United States is:

1. In a wiring device, insulation stripping means comprising a cutting base integral with said device, and an insulation-cutting member in engagement with said cutting base having a cutting edge angularly bendable from said cutting base, said cutting base defining a passageway for the insertion of insulated wire which, when inserted, bends said insulation-cutting member from said cutting base in the direction of insertion of said wire, and which, when withdrawn, produces a wedging return movement of the cutting edge of said insulation-cutting member followed by stripping of the insulation from the end of the insulated wire which was inserted through the passageway.

2. In a wiring device, an insulation stripper comprising a cutting base integral with said device and defining an opening through which an insulated wire end can be inserted, and an insulation-cutting member in engagement with said cutting base arcuately bendable from said cutting base, said insulation-cutting member having a cutting edge biased partially to block said opening whereby an insulated wire end on insertion through said opening bends said cutting edge arcuately away from said opening in the direction of insertion of said wire and on withdrawal restores said cutting edge to its initial position thereby forcing said cutting edge through a portion of the wire insulation.

3. In a wiring device, a metal mounting strap defining an opening through which an insulated wire end is insertable, and a cutting edge in engagement with said mounting strap biased to block said opening and arcuately bendable therefrom when an insulated wire end is inserted therethrough in the direction of insertion of said wire whereby upon withdrawal of said wire end said cutting edge exerts cutting pressure against the insulation thereof.

4. In a wiring device, a metal mounting strap defining an opening through which an insulated wire end is insertable, and an arcuately movable plate riveted to said mounting strap, said plate having a cutting edge positioned to block said opening whereby an insulated wire end inserted through said opening displaces said plate through an arcuate path in the direction of insertion of said wire which enables said wire to slide past said cutting edge whereby when said wire is withdrawn said cutting edge exerts cutting pressure against the insulation of said wire.

5. A wiring device as claimed in claim 2 wherein the integral cutting base defining an opening constitutes part of a housing defining a passageway and the insulation-cutting member includes a cutting edge in engagement with the wall of said passageway.

References Cited in the file of this patent

UNITED STATES PATENTS

| | | |
|---|---|---|
| 1,314,759 | Silvernail | Sept. 2, 1919 |
| 1,673,196 | Johnson et al. | June 12, 1928 |
| 2,787,177 | Frye | Apr. 2, 1957 |
| 3,057,232 | Cornell | Oct. 9, 1962 |

FOREIGN PATENTS

| | | |
|---|---|---|
| 641,067 | Great Britain | Aug. 2, 1950 |